Figure 1:
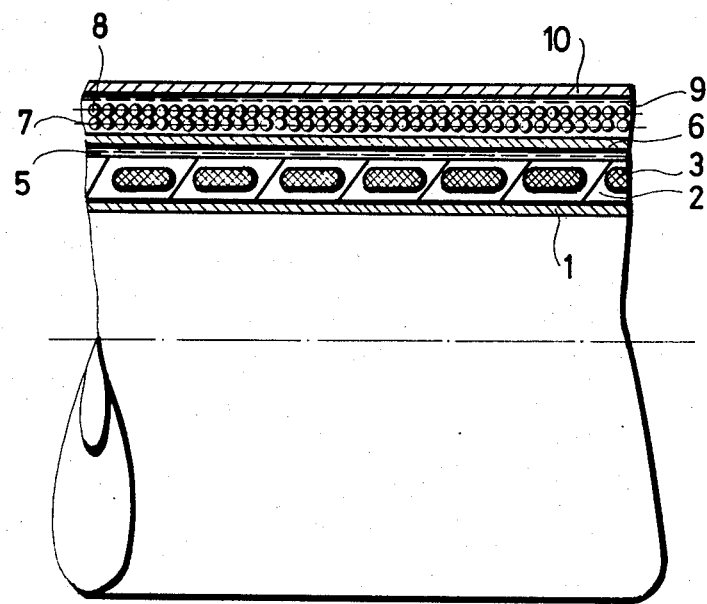

United States Patent [19]

Antal et al.

[11] 4,241,763

[45] Dec. 30, 1980

[54] RUBBER HOSE WITH SPIRAL FIBER REINFORCING CORE

[75] Inventors: Sándor Antal; Zoltán Bartha; Peter Gorgényi; Nándor Meitzen; Mihály Árvai, all of Budapest, Hungary

[73] Assignee: Taurus Gumiipari Vallalat, Budapest, Hungary

[21] Appl. No.: 3,769

[22] Filed: Jan. 11, 1979

Related U.S. Application Data

[63] Continuation of Ser. No. 837,868, Sep. 29, 1977, abandoned.

[51] Int. Cl.³ .......................... F16L 11/00; F16L 9/00
[52] U.S. Cl. .................................... 138/127; 138/133; 138/138; 138/174; 156/143; 156/123 R; 428/36; 428/222; 428/285; 428/286; 428/288

[58] Field of Search ................. 428/36, 371, 222, 392, 428/250, 285, 286, 288; 138/123–127, 129, 130, 134, 137, 138, 153, 140, 144, 174; 156/143, 123 R

[56] References Cited

U.S. PATENT DOCUMENTS

| 3,737,353 | 6/1973 | Gilbu . |
| 3,982,982 | 9/1976 | Chudger ............................... 428/36 |

Primary Examiner—Paul J. Thibodeau
Attorney, Agent, or Firm—Young & Thompson

[57] ABSTRACT

A flexible rubber hose has a spiral wound reinforcing core of resin bonded fibers embedded in the rubber, and a reinforcing insert, which may be woven or spiral wound, on the outer side of the helical core. The fibers are preferably glass fibers embedded in epoxy or phenolic resin.

2 Claims, 8 Drawing Figures

RUBBER HOSE WITH SPIRAL FIBER REINFORCING CORE

This is a continuation of application Ser. No. 837,868, filed Sept. 29, 1977, now abandoned.

The invention concerns a rubber hose including an insert or core (these terms are used interchangeably herein) made of a spiral system of fibre-reinforced synthetic resin and a circular-woven or helically developed insert or core system, which hose is capable of withstanding the combined effect of simultaneously acting stress forces of internal and/or external pressure or vacuum and axial tensile and/or torsional loads.

There are known rubber hoses of special type produced by conventional technology and capable of withstanding the effect of internal pressures or vacuum and small external pressures and/or tensile stresses.

Such rubber hoses are constructed of an internal stiffening helical system wound with a small pitch-angle and of at least one but usually more insert or core system(s) placed above or under the spiral system; the insert is made of a textile, cord or a metal filament or cable, dimensioned to produce the required rigidity to withstand the internal pressure applied. The material of the stiffening spiral is always a metal, i.e. a steelwire of circular or rectangular cross-section, and it plays an important role when vacuum or an external pressure is applied.

With the accelerating progress of technical development, increasingly a demand arises for hoses capable of bearing very large combined stress loads, such as high external pressure, tensile load, torque and vacuum which in many cases act simultaneously. Such hoses are required e.g. for deep-sea drilling, as well as for supply pipe lines, flexible deep-sea conduits or cables, flexible boring bars and for flexible pipe line systems for pile-driving hammers.

The above-described hoses comprising internal, stiffening helically wound cores are not suitable for bearing very large stress loads, due to the fact that coil winding at a low pitch angle of the steel wire forming the stiffening system is very difficult when a certain limit in the cross-section of the wire is exceeded. The coiling of a solid metal wire of large cross-section, which would be necessary to bear the applied stress loads in use, cannot be achieved. This sets an upper limit on the load/stress-bearing capacbility and also on the diameter of the hose. A further drawback of steel spiral wire is that steel has a low limit of elastic deformation as a result of which even small circumferential deformations can cause permanent deformations of the shape of the hose.

British Pat. No. 1,423,059 discloses a hose construction which is said to be able to bear high stress loads. This construction is, however, entirel different from the customary design and traditional process of manufacture of hoses. Such hose comprises one or more reinforcing insert(s)/core(s) of steel wire with specially shaped cross-sections. These cores or inserts consist of wires of S- or Z-shaped profiles, linked together. The flexibility of the hose is achieved by the movement within each other of the interlinked profiled metal elements and by the provision of an elastomeric or plastics layer interposed between the outer surfaces of the profiled elements. The drawbacks of this construction are the heavy weight of the inert(s) or liner(s) and that the parts made of metal and resilient materials are not bound together and thus under stress they do not behave as a uniform homogeneous system. As a result, the hose becomes rigid under internal pressure and separation surfaces develop in use or even in the course of the manufacture of the hose itself; the profiled elements are displaced, they pinch and crumble the elastomeric layer embedded between them, or when the hose is twisted, the linked profiled wires open up. The locations of the hose where these undesirable effects manifest themselves become increasingly exposed to the effects of corrosion, wear and tear and to other life-shortening effects and can cause trouble in the practical use of the hose. A complete separation of the linkage of the profiled wires can cause the hose to burst.

It is also known that glass fibre reinforcement may advantageously be used for hose construction particularly where the hose has to bear tensile and bending stress forces.

In practice, several attempts have been made for using laminated glass reinforcement in hoses. Such constructions can, however, be used only in the case of small stress loads, mainly in the case of plastics hoses. Such constructions are described e.g. in the British Pat. No. 1,197,595. The essence of this construction is that it contains extruded strips, hollow bodies and glass fibre reinforcement placed inside the cavity of the hollow bodies as constructional elements of the hose. The final shaping of the product is carried out immediately after extrusion, by hot-pressing, optionally combined with additional heating, to achieve fusion.

The glass fibres are in form of parallel untwisted tows thus rendering the core of the hose rigid. When a helical core of large cross-section is bent, then due to the difference in the length of the "thread" varying pre-tensions and "crinkles" are generated in the fibres.

It is known from British Pat. No. 1,488,977 to provide a hose capable of bearing high internal and/or external pressures, which has a core made of a system of stiffening rings formed by densely packed mutually parallel resin glass-fibres. According to this prior invention, the use of a spiral consisting of a system of resin-glass fibres is considered positively detrimental.

However, the construction described in this prior publication i.e. the manufacture of the structural elements of the resin-glass fibre system and their fitting onto the hose makes the production technology of the hose cumbersome and complicated and the production itself cannot be carried out by the conventional methods and equipment of hose manufacture.

It must be considered as another disadvantage of this design that such a hose is not suitable for bearing various large complex loads e.g. simultaneously acting external and internal pressures, tensile and torsional stresses.

As a further drawback, regard must be had to the fact that the rings consist of a system of densely packed resin-glass fibres laid side-by-side, and due to the radial-type hose design, the hose becomes too rigid i.e. is difficult to bend.

The word "hose" as used herein, including the patent claims, is not restricted to a product performing the customary (conveying) functions of a hose but covers all design and structural elements used in other domains of industry where their function is to bear the mentioned large stress loads and its design and construction makes its application possible. Such structural elements suitable for bearing tensile and torsional stresses and/or pressures are not necessarily uni-axial, concentric or cylindrical, but may have several different curvatures in different directions.

The essence of the hose according to the invention is that, in addition to its per se known core system providing resistance to internal pressure, it is provided with a helically wound, wholly or partly rubber-coated fibre-reinforced synthetic resin stiffening and/or reinforcing insert(s) which, together with an adjacent elastomeric layer, form(s) a cross-linked adhesively bonded integrated homogeneous system that acts as a unitary system.

In a preferred embodiment of the invention helically twisted glass fibre is used in the fibre-reinforced synthetic resin, but fibres of steel, carbon, boron and organic substances such as an aramide, imide, or amide may also be used with advantage. If so required, the fibre-reinforced resin helix may include an electrically conducting fibre e.g. a flexible metal filament.

According to another preferred embodiment of the invention, the hose is provided with a cushion layer which determines the flexibility and the flexural and torsional moduli of the hose; this layer is interposed between cores which are spaced at angular intervals of at least 30°.

In the system of resin and reinforcing fibre the resin used is preferably an epoxy resin or a phenolic resin.

In the preferred embodiments of the invention, the fibre-reinforced synthetic resin helix or helices is (are) wound such that the pitch, or distance between two adjacent turns, is at most one-tenth of the diameter of the core, or, in the case where a spacer layer is used, this value is increased by the width of such a layer.

It is a characteristic of the manufacturing process that the fibre-reinforced synthetic resin—which may be preheated—is, at least partly, rubber-coated after extrusion and set aside at room temperature for a relaxation time determined by the other technological steps of the production and thereafter:

(a) the fibre-reinforced synthetic resin is made into a helix for use as one or more core(s) before completion of the cross-linking, and then the hose is built up in a known manner, or (b) the hose is built up wholly partly in a known manner and the rubber-coated, fibre-reinforced synthetic resin is spiralised for a single or multiple liner, before completion of the cross-linking, and finally, by vulcanizing the hose in one or two steps, cross-linking is completed.

The choice between processes (a) and (b) will depend on which of a given number of hose cores should comprise a fibre-reinforced synthetic resin helix or helices.

The invention is described, purely by way of example, with reference to preferred embodiments illustrated in the accompanying drawings. To simplify the description, we refer, instead of fibre-reinforced synthetic resin, concretely to a resin-glass fibre system used as an internal helix, but the invention is not limited to this preferred embodiment which is described purely as an example. Thus other types of reinforcing fibres, mentioned above, may also be used instead of glass fibre and the fibre-reinforced synthetic resin helix may also be used externally or between the per se known reinforcing cores.

Figure 2:
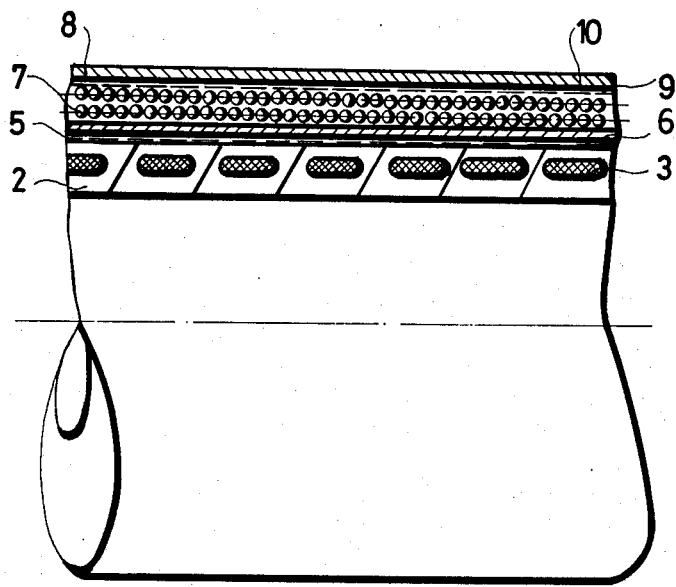
Figure 3:
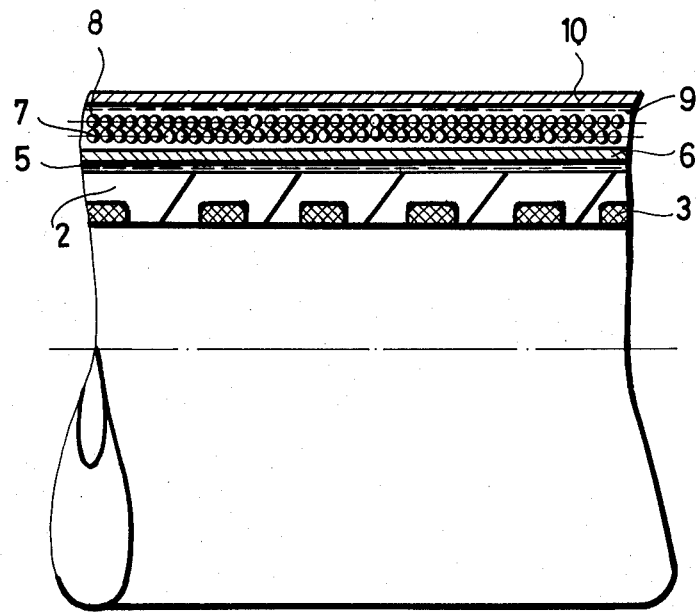
Figure 4:
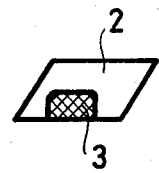
Figure 5:
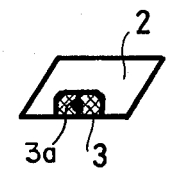
Figure 6:
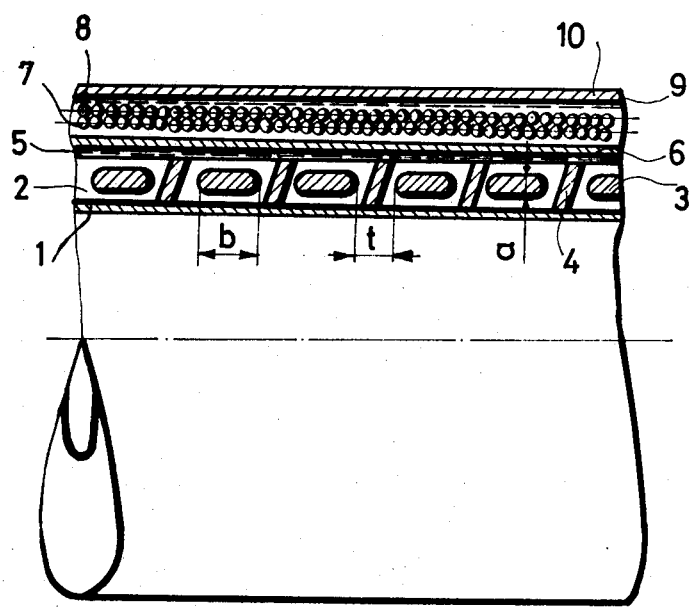
Figure 7:
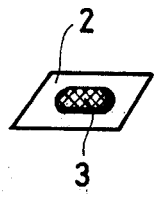
Figure 8:
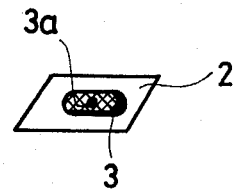

In the drawings:

FIG. 1 shows a longitudinal section of a first embodiment of a hose according to the invention, FIGS. 2 and 3 illustrate in longitudinal section two further embodiments of a hose according to the invention, FIGS. 4 and 5 show a cross-section of a helical core or insert consisting of a system of resin and glass fibre, FIG. 6 illustrates another embodiment of a hose according to the invention, in longitudinal cross-section, FIG. 7 shows a cross-section of the hose of FIG. 6, with the helix consisting of a system of resin and glass fibre, and FIG. 8 shows the same cross-section of the helix but with an electrically conducting metal filament embedded therein.

Referring to the drawings, the hose shown in FIG. 1 has an internal rubber layer 1 which is cross-linked with a rubber coating 2 of a helical core 3 made of a system of resin and glass fibre. The hose is fitted with reinforcing inserts 7 and 8 and a fabric reinforcement 5. The hose is protected against mechanical and chemical effects by a cover 10 provided with fabric reinforcement 9. A cushion layer 6 is located between the fabric reinforcement 5 and the reinforcing inserts 7 and 8, beneath the latter.

The hose shown in FIG. 2 differs from the hose illustrated in FIG. 1 in that it has no internal rubber layer 1, its innermost layer being formed by the rubber coating 2 of the helical core 3 consisting of a system of resin and glass fibre, facing the interior of the hose.

FIG. 3 illustrates the structure of a preferred hose according to the invention where the core 3 consisting of a system of resin and glass fibre is only partly provided with rubber coating 2.

The cross-section of the core 3 consisting of a system of resin and glass fibre and illustrated in FIG. 3 is shown in FIG. 4.

FIG. 5 shows spiral 3 with a built-in electrical conductor metal filament 3a.

The sealing ability (or, impermeability) of the hose illustrated in FIG. 6 is ensured by the internal rubber layer 1 which is chosen so that, by virtue of its chemical and physical properties, it should meet the requirements regarding the liquid to be conveyed by the hose. The internal rubber layer 1 forms an inseperably cross-linked unit with the helically developed rubber coating 2 comprising the embedded core 3 consisting of a system of resin and glass fibre. The helix of stiffening core 3 made of a system of resin and glass fibre has 1–3 turn start(s) and a spacer layer 4 is interposed between the turns of the helix. Using this layer, the distance t between two adjacent turns of the core 3 consisting of a system of resin and glass fibre can be selected at will; the distances a and b as shown illustrate the dimensions of the core in two orthogonal directions.

The internal pressure prevailing in the hose is transferred partly to the core 3 and partly via the space t to the reinforcing inserts 7 and 8. The equalisation of the acting forces is performed by the fabric reinforcement 5 which transfers the compression forces directly or via cushion layer 6 to the reinforcing inserts 7 and 8.

The hose is protected against mechanical and chemical effects by cover 10 fitted with a fabric reinforcement 9.

FIG. 8 shows a helical core consisting of a system of resin and glass fibre and provided with an electrically conducting metal filament 3a, whereby to make the hose suitable for conducting electricity, by ensuring a metallic connection between adjacent hoses, including couplings.

When the hose is subjected to tensile and/or torsional forces a radially inwardly directed distributive stress load is transferred from the reinforcing inserts 7 and 8 via the cushion layer 6 and through the top layer of the rubber coating 2 to the helically developed core 3 made of a system of resin and glass fibre. In a limiting case, this stress load can lead to the collapsing or bursting of the hose in two ways: either by bowing-out in a plane tangential to the helix or by a spatial bend.

Experiments have proved that a spatial bend occurs at smaller stress loads and the load bearing capability of the hose is improved if the ratio b/a (FIG. 6) is chosen such that the probability of the formation of a planar bow and a spatial bow should be at least equal. In this case: $b = 1.4a$ The tensile rigidity of the hose at a desirable level and the advantageous vibration damping properties of the hose enable this ratio to be increased without the risk of the collapsing of the hose.

The modulus of elasticity expressing the tensile rigidity of the hose would depend only on the modulus of elasticity of the reinforcing inserts 7 and 8 and on the modulus of elasticity of the core 3 consisting of a system of resin and glass fibre, if the two inserts are placed directly on top of each other. The interposed cushion layer 6 gives the possibility of controlling or selecting the desirable elasticity. The tensile rigidity can be further reduced, in addition by the effect of the cushion layer 6, by increasing the ratio t/b.

Among the hydraulic characteristics of the hose, the dynamic vibration damping is a very important one. The cushion layer 6 which is interposed between the stiffening and reinforcing systems of the hose and the spacer layer 4 arranged in the gap t, can absorb and store substantial deformation forces. In other words, the hose may with advantage be used in hydraulic systems working with very unevenly acting large pressure-shocks.

The change in the length of the hose caused by the effect of an internal pressure, depends not only on the design of the angles of reinforcing inserts 7 and 8, but also on the dimensions of the core 3 and the spacer layer 4. An increase in the width b and a reduction in the size of the gap t results in the core 3 (consisting of a system of resin and glass fibre) taking up a proportion of the internal pressure, thus imparting a stretching effect to the other layers. Conversely, a change of these dimensions in the opposite sense, can result in a layer-shortening tendency, in view of the steep angles of the reinforcing inserts 7 and 8 of the hose.

The dynamic effects of the hose, as described above, can be applied in any convenient combination. By selecting the dimensions a, b and t for the structure of core 3 consisting of a system of resin and glass fibre, a hose with the best characteristics to suit to any given mechanical system can be constructed.

The constructions according to the preferred embodiments of the invention have in addition to the advantages described above, a further substantial advantage i.e. the field of application is much greater than that of known hoses.

What we claim is:

1. In a flexible rubber hose comprising an outer rubber cover, a reinforcing fabric beneath the cover, and a metal wire reinforcement beneath the fabric; the improvement comprising a cushion layer reinforced with fabric beneath the wire reinforcement, and, beneath the cushion layer, a layer of rubber having at least partly embedded therein a helical core whose turns are spaced apart in the direction of the length of the hose by portions of said layer of rubber, the helical core consisting of reinforcing fibers embedded in thermoset synthetic resin, the cross-section of material of the helical core being flattened, the cross-section of the helical core having a length in the direction of the length of the hose which is at least 1.4 times the thickness of the cross-section of the helical core in a direction radially of the hose.

2. A flexible rubber hose as claimed in claim 1, in which said fibers are glass fibers.

* * * * *